(12) United States Patent
Pothering et al.

(10) Patent No.: US 9,183,267 B2
(45) Date of Patent: Nov. 10, 2015

(54) LINKED DATABASES

(75) Inventors: Joel Pothering, Seattle, WA (US);
Sandeep Phadke, Seattle, WA (US);
Mark Sterin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 649 days.

(21) Appl. No.: 12/785,502

(22) Filed: May 24, 2010

(65) Prior Publication Data
US 2011/0289055 A1    Nov. 24, 2011

(51) Int. Cl.
G06F 17/30    (2006.01)
(52) U.S. Cl.
CPC ............... G06F 17/30575 (2013.01)
(58) Field of Classification Search
CPC ............. G06F 17/30566; G06F 17/30575
See application file for complete search history.

(56) References Cited

U.S. PATENT DOCUMENTS

| | | | | |
|---|---|---|---|---|
| 5,491,817 | A * | 2/1996 | Gopal et al. | 707/770 |
| 5,506,984 | A * | 4/1996 | Miller | 1/1 |
| 5,574,914 | A | 11/1996 | Hancock et al. | |
| 5,754,841 | A * | 5/1998 | Carino, Jr. | 1/1 |
| 5,781,910 | A * | 7/1998 | Gostanian et al. | 707/610 |
| 5,937,406 | A * | 8/1999 | Balabine et al. | 1/1 |
| 6,035,298 | A * | 3/2000 | McKearney | 1/1 |
| 6,226,649 | B1 * | 5/2001 | Bodamer et al. | 709/203 |
| 6,233,586 | B1 * | 5/2001 | Chang et al. | 1/1 |
| 6,263,342 | B1 * | 7/2001 | Chang et al. | 1/1 |
| 6,272,488 | B1 * | 8/2001 | Chang et al. | 707/769 |
| 6,349,306 | B1 | 2/2002 | Malik et al. | |
| 6,496,828 | B1 * | 12/2002 | Cochrane et al. | 707/717 |
| 6,578,046 | B2 * | 6/2003 | Chang et al. | 1/1 |
| 7,260,579 | B2 * | 8/2007 | Keith, Jr. | 707/737 |
| 7,287,048 | B2 * | 10/2007 | Bourbonnais et al. | 1/1 |
| 7,376,658 | B1 * | 5/2008 | Bumgarner et al. | 707/736 |
| 7,533,115 | B2 * | 5/2009 | Chou et al. | 1/1 |
| 8,019,771 | B2 * | 9/2011 | Iwao | 707/759 |

(Continued)

FOREIGN PATENT DOCUMENTS

| | | |
|---|---|---|
| CN | 1804831 A | 7/2006 |
| CN | 101685449 A | 3/2010 |

OTHER PUBLICATIONS

Rowlands, Ian., "Data Federation and the CMDB", Retrieved at << http://blogs.ipedo.com/integration_insider/2009/01/data-federation.html >>, Jan. 2, 2009, pp. 1-2.

(Continued)

Primary Examiner — James Trujillo
Assistant Examiner — Hubert Cheung
(74) Attorney, Agent, or Firm — Henry Gabryjelski; Kate Drakos; Micky Minhas

(57) ABSTRACT

Several local databases may be linked together to form a large database. Each database may share a common type definition, but may contain only a portion of the large database. When a local database queries information from another database, the result may be stored locally using the type system. Across the entire database, items may be identified as their local or home database along with an identifier provided by that database. Cached information may be stored locally and may refer to the source for that information through the identifier. Once the cached information is present, queries that reference the record may be satisfied by the cached information. The cached information may be refreshed from the source database or may expire to avoid stale or changed data in the cache.

20 Claims, 4 Drawing Sheets

(56) References Cited

U.S. PATENT DOCUMENTS

| | | | |
|---|---|---|---|
| 8,019,778 B2* | 9/2011 | Niina | 707/770 |
| 8,041,706 B2* | 10/2011 | Agrawal et al. | 707/714 |
| 2002/0026443 A1* | 2/2002 | Chang et al. | 707/10 |
| 2003/0110358 A1* | 6/2003 | Goldberg et al. | 711/141 |
| 2004/0177348 A1* | 9/2004 | Kovarik et al. | 717/136 |
| 2005/0060337 A1* | 3/2005 | Chou et al. | 707/102 |
| 2005/0138081 A1* | 6/2005 | Alshab et al. | 707/200 |
| 2005/0149584 A1* | 7/2005 | Bourbonnais et al. | 707/204 |
| 2006/0026154 A1* | 2/2006 | Altinel et al. | 707/5 |
| 2006/0161557 A1* | 7/2006 | Dettinger et al. | 707/100 |
| 2006/0225032 A1 | 10/2006 | Klerk et al. | |
| 2007/0073674 A1* | 3/2007 | McVeigh et al. | 707/4 |
| 2007/0174292 A1* | 7/2007 | Li et al. | 707/10 |
| 2007/0203952 A1 | 8/2007 | Baron et al. | |
| 2007/0282856 A1* | 12/2007 | Mueller et al. | 707/10 |
| 2007/0294237 A1* | 12/2007 | John et al. | 707/4 |
| 2009/0063524 A1* | 3/2009 | Adler et al. | 707/101 |
| 2010/0287200 A1* | 11/2010 | Dhuse | 707/770 |
| 2011/0179031 A1* | 7/2011 | Sekiguchi et al. | 707/737 |
| 2011/0246671 A1* | 10/2011 | Guzenda | 709/240 |
| 2011/0307470 A1* | 12/2011 | Kamimura et al. | 707/713 |

OTHER PUBLICATIONS

Marquis, Hank., "CMDB 3.0", Retrieved at http://www.itsmsolutions.com/newsletters/DITYvol3iss24.htm >>, vol. 3.24, Jun. 12, 2007, pp. 1-4.

Johnson, Mark W., "CMDB Federation DMTF Standards for Federating CMDBs and other Management Data Repositories", Retrieved at << http://www.dmtf.org/standards/cmdbf/DMTF_Standards_for_Federating_CMDBs_20090910v2.pdf , Sep. 10, 2009, pp. 1-24.

"First Office Action and Search Report Received for Chinese Patent Application No. 201110148708.8", Mailed Date: Jul. 3, 2015, 12 pages.

* cited by examiner

LINKED DATABASES

BACKGROUND

Some applications may manage and manipulate very large amounts of data. In many cases, the data may be organized into different data sets for security, performance, and other reasons.

Accessing the data in a timely manner, including geographically dispersed data sets, can be difficult as the amount of data gets very large.

SUMMARY

Several local databases may be linked together to form a large database. Each database may share a common type definition, but may contain only a portion of the large database. When a local database queries information from another database, the result may be cached locally using the common type definition. Across the entire database, items may be identified as their local or remote database along with an identifier provided by that database. Cached information may be stored locally and may refer to the source for that information through the identifier. Once the cached information is present, queries that reference the record may be satisfied by the cached information. The cached information may be refreshed from the source database or may expire to avoid stale or changed data in the cache.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
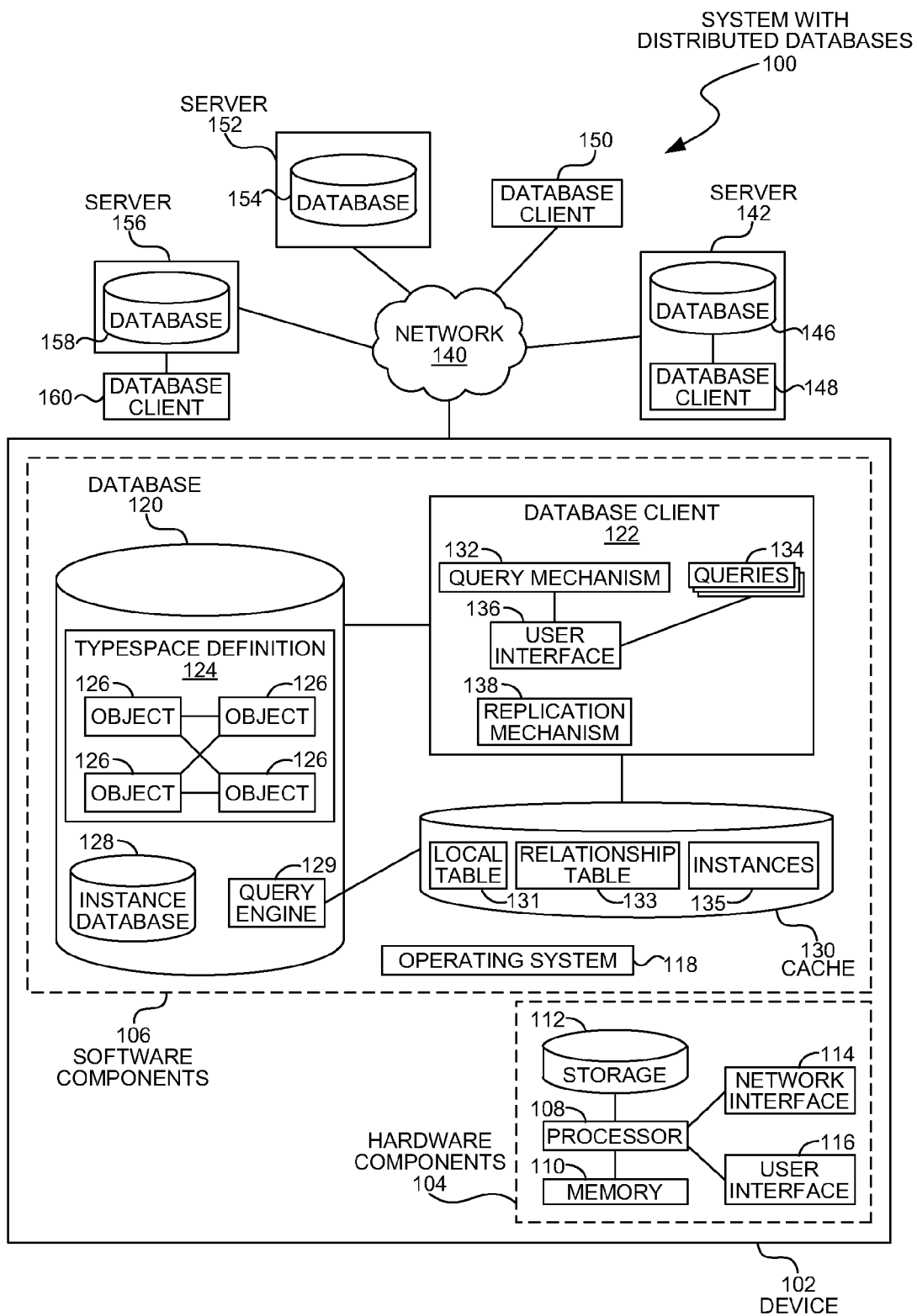
FIG. 1 is a diagram illustration of an embodiment showing a system with a distributed federated database.

A distributed database may comprise multiple local databases that may be connected using a network. Each local database may have a database identifier as well as locally managed indexes for records stored in the database, and each local database may be able to perform queries that retrieve records stored on other local databases. When the records are retrieved, some or all of the retrieved records may be stored in a local cache.

Each local database may have a base management entity table comprising a list of all records in the local database, including records stored in the local database and the cache. Each local database may also have a relationship table that may define any relationships between items in the local database and the records in the cache. The relationship tables may be used to speed up subsequent queries, as well as for updating replicated data.

Each local database may have a copy of the data types stored in all of the other local databases, which may allow any local database to store some data from other local databases.

The data replicated in the local caches may represent a subset of the data available from each local database. In many cases, the local cache may contain results from previous or anticipated queries, but may not contain all of the data related to any object that was queried. By using a subset of all the available data, each local system may be able to respond to many queries very quickly, as the data for the query may be locally available.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system with a distributed database. Embodiment 100 is a simplified example of a device in which database client may retrieve information from several databases and cache that information locally.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a distributed or federated database system. In many large databases, the contents of the database may be so large that a single database may not be capable of handling the entire set of data. Some database systems may have an upper limit on the size of the database that may be accessed.

The distributed or federated database system of embodiment 100 may have several independent databases that share a common typespace. A database client may be able to query against all of the databases, and the federation of the various databases may appear to the client as one very large database. Because the larger database may be broken into many separate databases, the size of the overall database may be much larger than may be feasible to deploy on a single database.

The common typespace may be a type definition that defines all of the objects stored in the combined databases. The typespace may use simple or complex types to define the objects, and may further define relationships between those objects. The common typespace may allow any client that retrieves data from any part of the federated database to store that data locally, for example.

Embodiment 100 uses a local cache to store items retrieved from remote databases. When data are retrieved from a remote database, a user may experience some lag time or delay in viewing data after a query. By using the local cache, such data may be instantly retrieved, leading to an improved user experience.

The local cache may consist of a local table that contains all of the items stored locally. The local table may be queried to determine if the data are available locally and, if so, the data may be retrieved from the local database or the local cache. In some embodiments, certain items may be identified for local storage while other items may not be locally stored.

The local cache may also include a relationship table. The relationship table may point to the source database for a cached item, and a similar relationship table may be placed in the source database. When an item may be retrieved from a remote database, the relationship tables on the local and remote databases may be updated.

The relationship tables may be used by the source database to identify any cached versions of an object so that the object may be updated in the cache when the object is modified in the source database. In some embodiments, a replication mechanism may be used to ensure that data stored in a local cache may be synchronized or updated with any changes in the source database.

In some embodiments, such a replication mechanism may push changes from the source database to the cached versions. Such embodiments may allow a one-way update, where changes may be entered into the source database. In other embodiments, the replication mechanism may be a two-way synchronization where changes to the cached version of an object may be synchronized with the source database and cause the source database to be updated.

The relationship tables may be used by the local database client to find the source database for additional data relating to any cached data. In embodiments with multiple remote databases, such a lookup may eliminate an additional query to determine which of the remote databases may contain information being queried.

The device 102 may represent a typical computer device, such as a desktop computer or server, having hardware components 104 and software components 106. In some embodiments, the device 102 may be a laptop computer, netbook computer, tablet computer, mobile telephone, handheld personal digital assistant, game console, network appliance, or any other computing device.

The architecture illustrated for device 102 may represent a typical architecture with hardware and software components; however, other architectures may be used to implement some or all of the distributed database system.

The hardware components 104 may include a processor 108, random access memory 110, and nonvolatile storage 112. The hardware components 104 may also include a network interface 114 and a user interface 116.

The software components 106 may include an operating system 118 on which various applications may execute, including a database 120 and a database client 122.

The example of device 102 contains both a database 120 and a database client 122. In many embodiments, the database 120 and database client 122 may be operated on different hardware platforms. For example, a server computer or cluster of server computers may implement the database 120, while a desktop computer may implement the database client 122.

The database 120 may have a typespace definition 124. The typespace definition 124 may define all of the objects 126 and relationships between objects in the global database. In some embodiments, the typespace definition 124 may define specific tables and relationships between tables as defined in a conventional relational database. In other embodiments, the typespace definition 124 may be more abstract, by defining 'objects' and relationships between 'objects'. Each object may be defined with a set of parameters, and each parameter may be defined using a type definition system, which may build complex types based on primitive types. In some embodiments, the typespace definition 124 may be in a declarative form such as XML or other expression.

The typespace definition 124 may define all of the objects, parameters, types, tables, or other information that may be stored in any portion of the federated database. The typespace definition 124 may be used to create local caches of instances retrieved from remote databases. In many embodiments, a replication mechanism may replicate the typespace definition 124 between all databases that are members of the combined or federated database.

The database 120 may include an instance database 128. The instance database 128 may store all of the instances of objects that are stored in the database 120. An instance may comply with one or more of the objects 126 defined in the typespace definition 124 and may represent an actual representation of the object.

The instances stored in the instance database 128 may be a subset of the data stored in a larger, federated database and may not be all of the instances within the database. The instance database 128 may also be referred to as a "local database" in the claims and other sections of this specification.

Each embodiment may divide all of the instances in a federated database into different local databases, and may do so in different manners. For example, an enterprise database that may be used across many different locations may have local databases established for each geographic region or location. In such an example, each local database may contain instances for many if not all of the objects in the typespace definition.

In another example, the local databases may be organized by various functions. In such an example, different objects or groups of objects may be locally stored in specific databases. For example, each department or organizational group may have their own portion of the federated database that the group may access the most. The local databases may be federated and allow searching or queries across multiple local databases, while allowing each group to have local access to the data the groups may access more frequently. In such an example, a local database may contain instances for a subset of the total objects defined in the typespace definition.

The typespace definition may be replicated between each database in the federation.

The database client 122 may communicate with the database 120 as well as other, remote databases. The database client 122 may have a query mechanism 132 that may generate queries that are run against the database 120 and other databases in the federated database. The query mechanism 132 may transmit the queries to a query engine 129 which may execute the query against the instance database 128.

The database client 122 may include a user interface 136 that may allow a user to interact with the data, including adding new data, modifying existing data, and browsing data. In many cases, the database client 122 may be an application that has many predefined queries 134. The queries 134 may represent data that may be displayed on the user interface 136. In some embodiments, the user interface 136 may be displayed on the local hardware user interface 116. In some embodiments, the user interface 136 may be expressed in HTML or other language and displayed on another device using a browser, for example.

When a query may be made to a remote database, the results from the query may be stored in a cache 130. The cache 130 may contain a local table 131, a relationship table 133, and instances 135 received from the remote database.

The local table 131 may contain a listing of all the locally stored objects, including the objects in the instance database 128 and the cached instances 135. When a query is begun, the local table 131 may be examined to determine whether or not the requested data may be available locally. If so, the query may be performed using local data. If not, the query may include one or more queries to other remote databases.

The reference table 133 may contain references or links between objects in the local database and objects retrieved from remote databases. The reference table 133 may be used by a replication mechanism 138 to synchronize the cached data with the remote database, for example. In another use, the reference table 133 may be used to locate a remote database to gather additional information when requested through a query.

The instances 135 may include instance data retrieved from remote database. The instances 135 may be copies of data obtained from remote databases. In some cases, the replication mechanism 138 may refresh the instances 135 and synchronize the instances 135 with the remote databases.

In some embodiments, the replication mechanism 138 may not update the instances 135. In such embodiments, the instances 135 may be stored for a short period of time and then expire and be removed from the cache 130.

The architecture of the federated database may include the device 102 connected to a network 140. The network 140 may be a local area network, wide area network, the Internet, or any other communications network.

A remote server 142 may contain a database 146 and a database client 148. Such a system may be a functional equivalent to the device 102. In some embodiments, the database client 150 may be on a separate hardware platform at the server 152 that include a database 154. In still another embodiment, a server 156 may contain a database 158 and may have a directly attached device that performs the functions of a database client 160.

Figure 2:
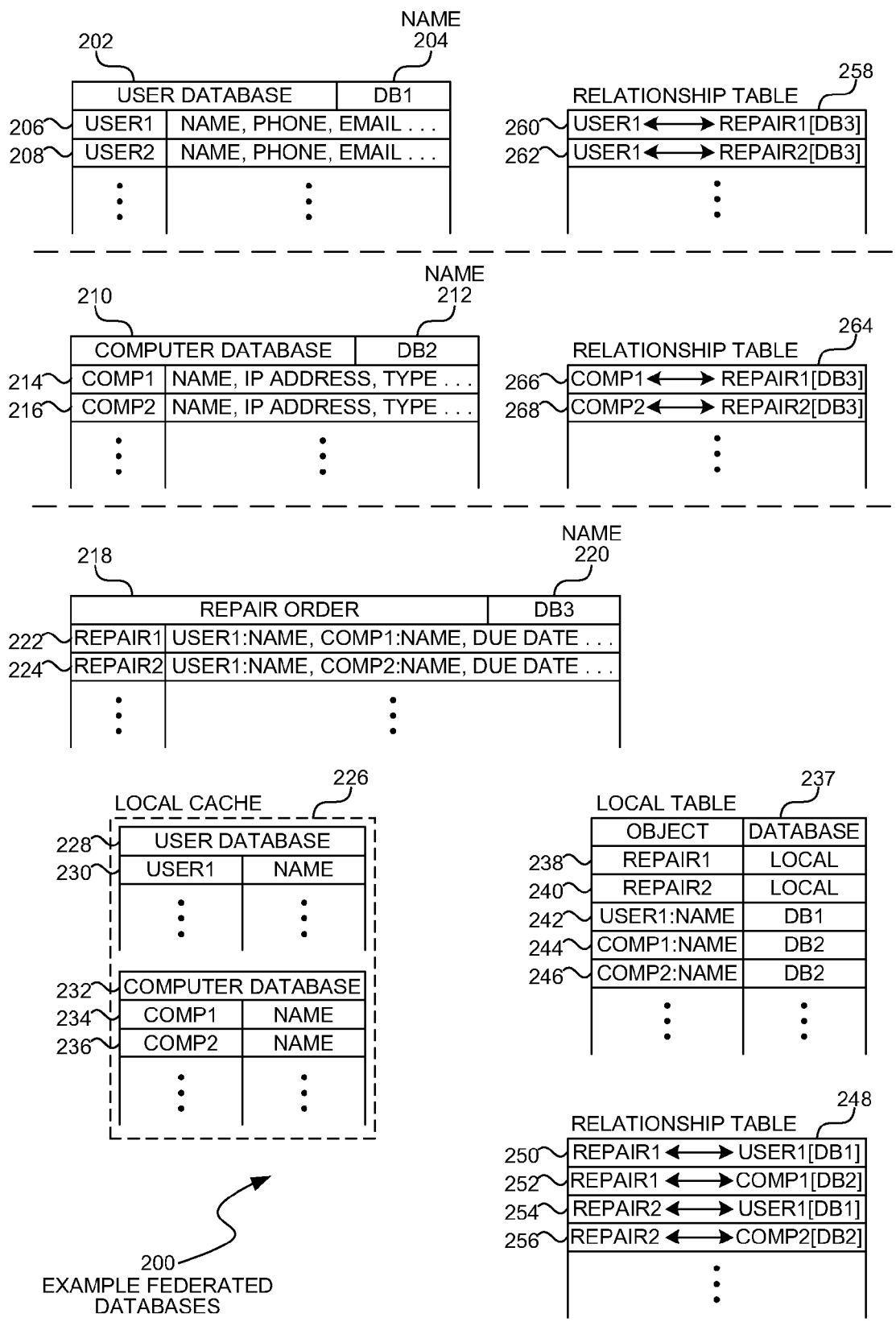
FIG. 2 is a diagram illustration of an example embodiment showing a distributed database.

FIG. 2 is a diagram illustration of an example embodiment 200 showing a federated database. Embodiment 200 is merely one example of how a database may be separated into several local databases and how a local table and relationship tables may be implemented.

Embodiment 200 is merely one example of a use for the distributed or federated database and is chosen to highlight the features and functions of the database.

Embodiment 200 uses as an example a repair database for computers. A user database 202 may contain user information, a computer database 210 may contain information about specific computers, and a repair order database 218 may contain repair orders that reference both the user database 202 and computer database 210. This simplified example may illustrate some relationships between databases and how a local table and relationship tables may function.

The various databases are illustrated as being located on separate hardware platforms and may be considered a federated database comprising all of the various local databases.

The user database 202 may have a database identifier or name 204. Within the user database 202, user1 206 and user2 208 may contain a name, phone number, email address, and other parameters. User1 206 and user2 208 may be examples of 'objects' stored in the database. For each object, several parameters may be defined that describe the object. In this case, the parameters of "name", "phone number", and "email address" may be parameters associated with the various objects.

Similarly, a computer database 210 may have a database identifier or name 212. Within the computer database 210, comp1 214 and comp2 216 may contain parameters of name, IP address, type, and other parameters.

The repair order database 218 may also have a database identifier or name 220. Within the repair order database 218, repair1 222 may contain parameters of "user1:name", "comp1:name", due date, and other parameters. The repair2 224 may contain parameters of "user1:name", "comp2:

name", due date, and other parameters. The notation "object: parameter" is used to define specific parameters that are linked to other objects.

The objects in the repair order database 218 may refer to specific information stored in other databases. For example, repair1 references the "name" value for user1 206 and the "name" value for comp1 214. Similarly, repair2 references the "name" value for user1 206 and the "name" value for comp2 216.

When a query may be made for the repair orders on a database client local to the repair order database 218, the database client may store information gathered from the user database 202 and computer database 210 in a local cache 226. The local cache 226 may be a cached instance database that may conform to or may be created using a typespace definition.

The local cache 226 may include a local version of a user database 228 that may contain an entry for user1 230 that may contain the name parameter retrieved from user1 206. Similarly, the local cache 226 may include a local version of a computer database 232 that may contain entries for comp1 234 and comp2 236. The entries for comp1 234 and comp2 236 may contain the name parameter retrieved from the computer database 210.

The local cache 226 may contain a subset of the available parameters for each of the objects stored in the cache 226. The subset may represent those values retrieved for a specific query. In the example of embodiment 200, such a query may request the listing of the repair orders with the full set of parameters.

In some embodiments, remote data may be retrieved and stored in the local cache 226 as a result of a specific user query. In other embodiments, the remote data may be fetched ahead of time when a set of predefined queries may be available.

A local table 237 may contain a listing of all the objects stored locally along with the source or origin database for the object. For example, repair1 238 and repair2 240 may be stored locally. User1:name 242 may be stored in "DB1", which may be the identifier of the user database 202. Comp1: name 244 and comp1:name 246 may have been retrieved from the computer database 210, as indicated by the "DB2" database.

The local table 237 may be the first lookup operation when beginning a query. The local table 237 may be used to determine whether or not the values being requested are locally available. When the values are locally available either in the local database or the local cache, the values may be retrieved quickly. When the values are not locally available, the values may be queried from a remote database.

A relationship table 248 may also be generated when data are stored in the local cache 226. The relationship table 248 may identify relationships between instances of objects in different databases. For example, repair1 250 has a relationship with "user1 [DB1]". The notation "user1 [DB1]" designates the object user1 206 in the user database 202. Similarly, repair1 252 has a relationship with comp1 214 from the computer database 210. Repair2 254 has a relationship with user1 206 from the user database 202 and repair2 256 has a relationship with comp2 216 from the computer database 210.

The relationship table 248 may be used by a database client to determine a source for additional information. For example, a query that requests the IP address for comp1 214 may search the relationship table 248 to determine that comp1 is located in the computer database 210 and the query may be made to the database 210. When no such relationship is present, the query may be directed to another database or to several databases to identify the location of comp1 214, and then a second query may be made to the computer database 210.

When data are stored in the local cache 236, relationship tables may be created on the devices hosting the remote databases. For example, relationship table 258 may contain a relationship between user1 260 and repair1 [DB3], as well as a relationship between user1 262 and repair[DB3]. Relationship table 264 may contain relationships for comp1 266 to repair[DB3] and comp2 268 to repair[DB3].

The relationship tables 258 and 264 may be used by the respective local databases to update the local cache 226. The relationship tables 258 and 264 may indicate where objects or parameters associated with objects may be locally cached, and the relationship may be used to send updates or to synchronize changes with the cache.

Figure 3:
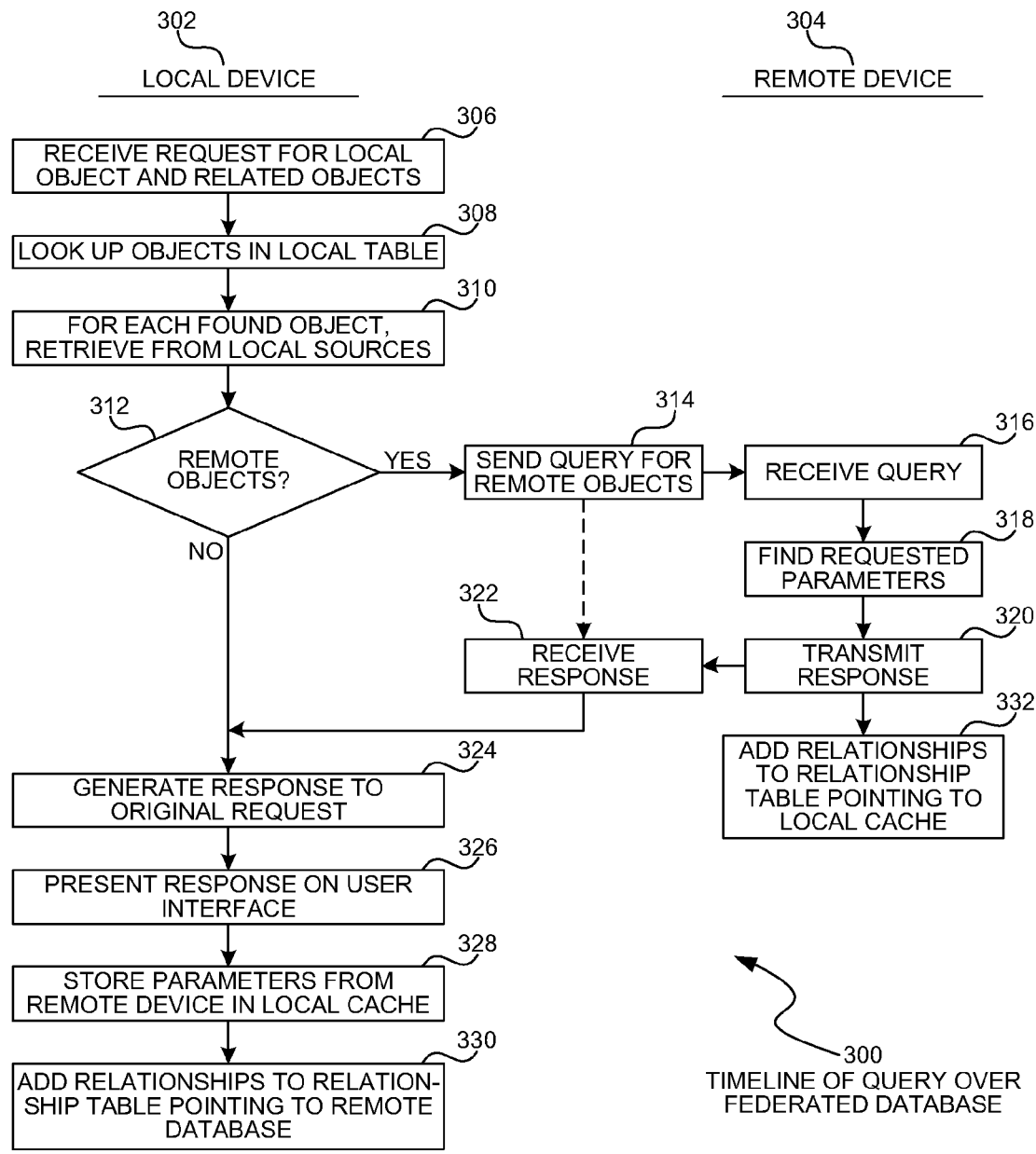
FIG. 3 is a timeline illustration of an embodiment showing a method for performing a query in a distributed database.

FIG. 3 is a timeline illustration of an embodiment 300 showing a method for performing a query over a federated database. Embodiment 300 is an example of a method that may be performed by a database client, such as the database client 122 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a simplified sequence by which a local device 302 with a local database may perform a query that may gather some information from a remote device 304. Later in this specification, embodiment 400 illustrates a more detailed example of some of the processing that may take place during a query and may reflect a different embodiment than is presented in embodiment 300.

The local device 302 may receive a request in block 306 for a local object and related objects. In the example of embodiment 200, such a request may include a request for the repair orders that link to data found in the user database and computer database.

In block 308, the objects may be looked up in a local table. The local table may include entries for every object stored locally, including objects in a local instance database and objects in a cache.

For each object found in the local table, the object may be retrieved using the local sources in block 310. The local sources of block 310 may be an instance database as well as a local cache.

If the query is satisfied using local sources, the process may advance to block 324. If not, remote sources may be used in block 312. A query for the remote objects may be transmitted in block 314 from the local device 302 and received in block 316 by the remote device 304. The remote device 304 may find the requested parameters in block 318 and transmit a response in block 320, which may be received in block 322 by the local device 302.

After gathering all of the data from both local and remote sources, a response may be generated to the original request in block 324 and may be presented on a user interface in block 326.

The parameters retrieved from the remote device 304 may be stored in a local cache in block 328. As part of the storage in the local cache, a local table may be updated to include the newly acquired data.

In block 330, one or more relationships may be added to a local relationship table, where the relationships point to the source database for the retrieved parameters. In block 332, the remote device 304 may also update a relationship table pointing to the local cache.

Figure 4:
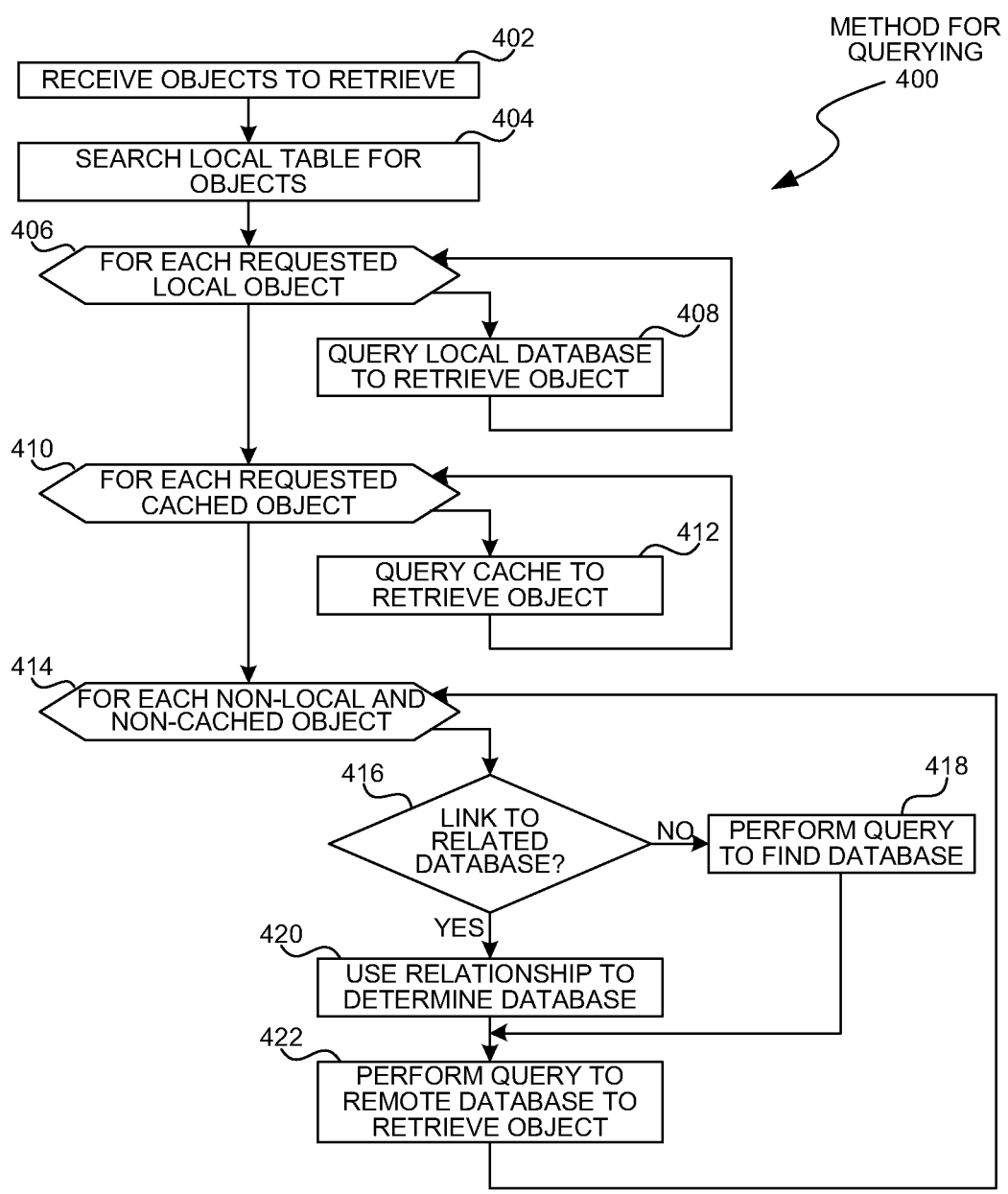
FIG. 4 is a flowchart illustration of an embodiment showing a method for using a relationship table to find a source database.

FIG. 4 is a flowchart illustration of an embodiment 400 showing a method for performing a portion of a query. Embodiment 400 may illustrate a more detailed example of the operations of blocks 306 through 310 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is an example of a method for analyzing a query to determine if objects are locally present and gathering the local objects. For object located remotely, a relationship table may be used to determine where the objects may be located.

The objects to retrieve may be received in block 402.

A local table may be searched in block 404 to determine which objects are locally stored and which are remotely available.

For each requested local object in block 406, the object may be queried from a local database in block 408.

For each requested cached object in block 410, the object may be queried from the cache in block 412.

If an object is not located in the local database or local cache, the object may be available remotely. For each of such items in block 414, the relationship table may be searched to determine if there is a link to a related database for the object in block 416. If such a relationship exists, the relationship may be used to determine a remote database in block 420.

If an object does not have a relationship in the relationship table in block 416, a query may be performed against another database to determine the location of the object in block 418.

Once the remote database is determined in either blocks 418 or 420, the remote database may be queried in block 422 to retrieve the object.

Embodiment 400 illustrates one use of a relationship table. In such a use, existing relationships may be used to identify remote databases to query. When such a relationship is not found, an additional query may be made to determine the remote database. However, such a query may be eliminated when a relationship is present.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. An enterprise database system comprising:
a processor;
a plurality of databases participating together as participants of an enterprise database for an enterprise, the enterprise having a plurality of enterprise domains, the enterprise database combining together objects from the plurality of enterprise domains to present a data set as being available from a single database;
each database in the plurality of databases including an instance database and an associated cache, a local table, and a relationship table,
wherein the instance database stores objects more frequently accessed from an enterprise domain, from among the plurality of enterprise doamins, and
wherein the associated cache stores cached instances of other objects frets more frequently accessed from one or more other enterprise domains, from among the plurality of enterprise domains, but that are at least temporarily relevant within the enterprise domain,
wherein the local table lists locally stored objects, including objects stored in the instance database and other objects stored in the associated cache, and
wherein the relationship table indicates relationships between objects stored in the database and objects stored in the one or more other databases, the one or more other databases for different enterprise domains from among the plurality of enterprise domains;
each enterprise domain including one or more database clients configured to process a query issued against the enterprise database from within the enterprise domain, including:
receive a request for one or more objects stored in the enterprise database, the one or more objects identified in a query issued against the enterprise database from within the enterprise domain;
refer to the local table to determine if any of the one or more requested objects are available locally in the database, including determining if any of the one or more requested objects are stored in the instance database due to being more frequently accessed from the enterprise domain or if any of the one or more requested objects are stored in the associated cache due to being at least temporarily relevant within the enterprise domain;
for any of the one or more requested objects not available locally, refer to the relationship table to determine if there is a relationship between the requested object and another database from among the one or more other databases, the other database in one of the one or more other enterprise domains;
for at least one object not locally available and for which the relationship table does indicate a relationship to another database, directly access the at least one object from the other enterprise domain by using a reference to the other database contained in the relationship table, directly accessing the at least one object from the other database conserving network resources; and
for any of the one or more requested objects not available locally and for which the relationship table does not indicate a relationship to another individual database:
query the one or more other databases to determine the location of the requested object; and
query the determined location to retrieve the requested object.

2. The enterprise database system of claim 1, wherein the one or more other databases comprises a first database being located on a first hardware platform.

3. The enterprise database system of claim 2, wherein the one or more other databases comprises a second database being located on a second different hardware platform.

4. The enterprise database system of claim 1, wherein the one or more enterprise domains are divided by one or more of: geographic region and organizational group.

5. At a computer system, the computer system including a database and a processor, the database participating with one or more other databases to form an enterprise database for an enterprise, the enterprise having a plurality of enterprise domains, the enterprise database combining together objects from the plurality of enterprise domains to present a data set as being available from a single database, the database having an instance database and an associated cache, a local table, and a relationship table, the instance database storing objects more frequently accessed from an enterprise domain, from among the plurality of enterprise domains, the associated cache storing cached instances of other objects more frequently accessed from one or more other enterprise domains, from among the plurality of enterprise domains, but that are at least temporarily relevant within the enterprise domain, the local table listing locally stored objects, the relationship table indicating relationships between objects stored in the database and objects stored in the one or more other databases, the one or more other databases for different enterprise domains from among the plurality of enterprise domains, a method for identifying data responsive to a query issued against the enterprise database, the method comprising the processor:
- receiving a request for one or more objects stored in the enterprise database, the one or more objects identified in a query issued against the enterprise database from within the enterprise domain;
- referring to the local table to determine if any of the one or more requested objects are locally available in the database, including determining if any of the one or more requested objects are stored in the instance database due to being more frequently accessed from the enterprise domain or if any of the one or more requested objects are stored in the associated cache due to being at least temporarily relevant within the enterprise domain;
- for any of the one or more requested objects not locally available, referring to the relationship table to determine if there is a relationship between the requested object and another database from among the one or more other databases, the other database in one of the one or more other enterprise domains;
- for at least one object not locally available and for which the relationship table does indicate a relationship to another database, directly accessing the at least one object from the other enterprise domain by using a reference to the other database contained in the relationship table, directly accessing the at least one object from the other database conserving network resources; and
- for any of the one or more requested objects not available locally and for which the relationship table does not indicate a relationship to another database, querying the one or more other databases to determine the location of the requested object.

6. The method of claim 5, further comprising subsequent to referring to the local table, for any of the one or more objects that are locally available, accessing an instance database to retrieve the locally available object.

7. The method of claim 5, further comprising subsequent to referring to the local table, for any of the one or more objects that are locally available, accessing cached instances to retrieve the locally available object.

8. The method of claim 5, further comprising including the directly accessed at least one object in a query response.

9. The method of claim 5, further comprising subsequent to querying the one or more other databases to determine the location of the requested object, querying the determined location to retrieve the requested object.

10. The method of claim 9, further comprising storing a requested object in the associated cache.

11. The method of claim 9, further comprising adding a relationship between the requested object and the determined location to the relationship table.

12. The method of claim 5, wherein the one or more enterprise domains are divided by one or more of: geographic region and organizational group.

13. A computer program product for use at a computer system, the computer system including a database, the database participating with one or more other databases to form an enterprise database for an enterprise, the enterprise having a plurality of enterprise domains, the enterprise database combining together different objects from the plurality of enterprise domains to present a data set as being available from a single database, the database having an instance database and an associated cache, a local table, and a relationship table, the instance database storing objects more frequently accessed from an enterprise domain, from among the plurality of enterprise domains, the associated cache storing cached instances of other objects more frequently accessed from one or more other enterprise domains, from among the plurality of enterprise domains, but that are at least temporarily relevant within the enterprise domain, the local table listing locally stored objects, the reference relationship table indicating relationships between objects stored in the database and objects stored in the one or more other databases, the one or more other databases for different enterprise domains from among the plurality of enterprise domains, the computer program product for implementing a method for identifying data responsive to a query issued against the enterprise database, the computer program product comprising one or computer storage devices having stored thereon computer-executable instructions that, when executed at a processor, cause the computer system to perform the method, including the following:
- receive a request for one or more objects stored in the enterprise database, the one or more objects identified in a query issued against the enterprise database from within the enterprise domain;
- refer to the local table to determine if any of the one or more requested objects are locally available in the database, including determining if any of the one or more requested objects are stored in the instance database due to being more frequently accessed from the enterprise domain or if any of the one or more requested objects are stored in the associated cache due to being at least temporarily relevant within the enterprise domain;
- for any of the one or more requested objects not locally available, refer to the relationship table to determine if there is a relationship between the requested object and another database from among the one or more other databases, the other database in one of the one or more other enterprise domains;
- for at least one object not locally available and for which the relationship table does indicate a relationship to another database, directly access the at least one object from the other enterprise domain by using a reference to the other database contained in the relationship table, directly accessing the at least one object from the other database conserving network resources; and
- for any of the one or more requested objects not available locally and for which the relationship table does not indicate a relationship to another database, query the one or more other databases to determine the location of the requested object.

14. The computer program product of claim 13, further comprising computer-executable instructions that, when executed, cause the computer system to subsequent to referring to the local table, for any of the one or more objects that are locally available, access an instance database to retrieve the locally available object.

15. The computer program product of claim 13, further comprising computer-executable instructions that, when executed, cause the computer system to subsequent to referring to the local table, for any of the one or more objects that are locally available, access cached instances to retrieve the locally available object.

16. The computer program product of claim 13, further comprising computer-executable instructions that, when executed, cause the computer system to include the directly accessed at least one object in a query response.

17. The computer program product of claim 13, further comprising computer-executable instructions that, when executed, cause the computer system to subsequent to querying one of the one or more other databases to determine the location of the requested object, query the determined location to retrieve the requested object.

18. The computer program product of claim 17, further comprising computer-executable instructions that, when executed, cause the computer system to store the requested object in the associated cache.

19. The computer program product of claim 17, further comprising computer-executable instructions that, when executed, cause the computer system to add a relationship between the requested object and the determined location to the reference relationship table.

20. The computer program product of claim 13, wherein the one or more enterprise domains are divided by one or more of: geographic region and organizational group.

\* \* \* \* \*